(12) United States Patent
Wideman et al.

(10) Patent No.: US 6,525,133 B1
(45) Date of Patent: Feb. 25, 2003

(54) TIRE WITH TREAD WHICH UTILIZES AN ALPHA-METHYL STYRENE OLIGOMER

(75) Inventors: Lawson Gibson Wideman, Hudson, OH (US); Paul Harry Sandstrom, Tallmadge, OH (US); Mark Leslie Kralevich, Jr., Columbus, OH (US); Edward John Blok, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/538,072

(22) Filed: Mar. 29, 2000

(51) Int. Cl.$^7$ .................................................. C08L 5/01
(52) U.S. Cl. ........................ 524/848; 524/442; 524/495; 524/426; 524/427; 524/274; 152/209.1
(58) Field of Search ................................ 524/274, 442, 524/424, 495

(56) References Cited

U.S. PATENT DOCUMENTS

| | | | |
|---|---|---|---|
| 5,446,097 A | * 8/1995 | Nonaka et al. | 525/193 |
| 5,968,409 A | * 10/1999 | Mashita et al. | 252/182.18 |
| 6,221,953 B1 | * 4/2001 | Sandstrom et al. | 524/518 |
| 6,221,990 B1 | * 4/2001 | Blok et al. | 526/283 |
| 6,265,478 B1 | * 7/2001 | Kralevich et al. | 524/518 |

FOREIGN PATENT DOCUMENTS

| | | | | |
|---|---|---|---|---|
| DE | 23 39 918 A1 | * | 3/1975 | ............. C08K/9/04 |
| GB | 2 125 419 A | * | 7/1983 | ............. C08F/4/66 |
| JP | 11-140133 A | * | 5/1999 | .......... C08F/112/08 |

OTHER PUBLICATIONS

RD 16959.*
SU 891709 Dec. 31, 1981, Bochkareva et al. C08L 9/00 (Abstract in English).*
RO 103271 Jun. 25, 1992, Anghel et al. C07C 15/46 (Abstract in English).*

* cited by examiner

*Primary Examiner*—David W. Wu
*Assistant Examiner*—Rip A Lee
(74) *Attorney, Agent, or Firm*—Henry C. Young, Jr.

(57) ABSTRACT

A pneumatic tire with a rubber tread which utilized an alpha-methyl styrene oligomer

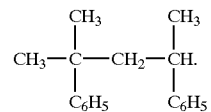

9 Claims, No Drawings

TIRE WITH TREAD WHICH UTILIZES AN ALPHA-METHYL STYRENE OLIGOMER

FIELD

This invention relates to a pneumatic tire with a rubber tread which utilizes an alpha-methyl styrene oligomer.

BACKGROUND OF THE INVENTION

Pneumatic rubber tires are sometimes intended to be used for purposes where traction (skid resistance) is a primary consideration. For example, it may be desired for a high performance tire tread rubber to have good initial grip, or traction, while also having good durability and, also, good overall traction or grip. Often for such tires, resistance to tread wear is less of a consideration.

Historically, for emphasizing tread rubber traction, the tread may, for example, be compounded to have a relatively high ratio of resin and processing oils to rubber (e.g. a range of about 15 to about 40 weight percent in the rubber composition) which may be more conventionally expressed in terms of parts by weight per 100 parts by weight rubber (phr) as being, for example, in a range of about 45 to about 120 phr.

The purpose of the resin, among other purposes, is to enhance traction of the tread due, at least in part, to a choice of resin with an appropriate softening point.

For example, a resin with a softening point of about 30° C. would be expected to soften and become very hysteretic at a tread temperature of about 20° C. to about 50° C. and, thus, aid in providing tire traction at such tread temperatures.

A considerably higher softening point resin would be desirable to enhance tread traction at a higher tread temperature (e.g. at least 100° C.) associated with the higher vehicular speed.

However, the resin may become too incompatible with the rubber and lose the tire traction properties.

Therefore, it is desirable to use a resin that is at least semi-compatible with the rubber.

Various examples of such resins which, as it is understood, are or may be used to aid in tire tread traction are hydrocarbon-derived synthetic resins, coumarone-indene resins, rosin, rosin derivatives and dicyclopentadiene based resins such as, for example, dicyclopentadiene/diene resins.

Such resins may typically have softening points (Ring and Ball) within the aforesaid range of about 20° C. to about 110° C. and even up to about 170° C.

In another aspect of tire tread rubber considerations, it should be pointed out that viscoelastic properties of a rubber, or a rubber blend, for tire tread applications, are important. For example, a tangent delta viscoelastic property is the ratio of the viscous contribution to the elastic contribution for a viscoelastic rubber article subjected to a cyclic deformation. The term "tangent delta" is often referred to herein as "tan. delta". Its characterization of viscoelastic properties of rubber is well known to those skilled in such art. Such property is typically represented in the form of a curve as a temperature sweep plot of tangent delta values on a y, or vertical, axis versus temperature on an x, or horizontal, axis.

Although various rubber compositions are taught to provide various benefits, some for tire treads, it is desired to provide a pneumatic tire having a rubber tread having enhanced traction qualities over a relatively wide temperature range and, thus, a tan. delta characteristic which maintains a high tan. delta as the temperature increases.

In the description of this invention, rubber compound, sulfur-cured rubber compound, rubber composition, rubber blend and compounded rubber are used somewhat interchangeable to refer to rubber which has been mixed with rubber compounding ingredients. Such terms are well known to those having skill in such art.

In the description of this invention, the term "phr" is an abbreviation for "parts (of an indicated material) by weight per 100 parts by weight rubber".

DISCLOSURE AND PRACTICE OF INVENTION

In accordance with this invention, a pneumatic tire is provided having an outer circumferential tread where said tread is comprised of, based upon 100 parts by weight rubber (phr), (A) 100 parts by weight of at least one diene hydrocarbon based elastomer;

(B) from about 1 to about 40, alternately about 3 to about 10, phr of a liquid alpha-methyl styrene oligomer;

(C) about 20 to about 150, alternately about 60 to about 100 phr of reinforcing filler selected from at least one of carbon black, precipitated silica and silica modified carbon black; and (D) a coupling agent for said silica and/or silica modified carbon black, as the case may be, having a moiety reactive with said silica, (usually hydroxyl groups on the surface of the silica such as silanol groups) and carbon black and another moiety interactive with at least one of said diene-based elastomers.

It is to be appreciated that said tread rubber composition may also contain (E) about one to about 50 phr of at least one resin having a softening point within a range of about 65° C. to about 165° C. (Ring and Ball softening point) selected from at least one of:

(i) coumarone-indene resin(s);
(ii) alkylated hydrocarbon resin(s);
(iii) aromatic petroleum hydrocarbon resin(s); and
(iv) dicyclopentadiene/diene resin(s).

A significant aspect of this invention is that the liquid resin greatly reduces the dynamic low-strain stiffness (G' at one percent strain), and gives a comparable high strain loss compliance (J" at fifty percent strain) to the control resin.

This is considered herein to be important because it tends to give tire traction at lower temperatures (G' at one percent strain) before tread heat-up can occur in the tread and, subsequent, improved cornering traction (J" at 50 percent strain) at higher tread temperatures.

The alpha-methyl styrene oligomer for use in this invention may be characterized as coupled alpha-methyl styrene moieties that tend to form in a head-to-tail fashion and may have a residual olefinic character.

The oligomer is composed primarily of dimers as may be represented by the following Formula (I)

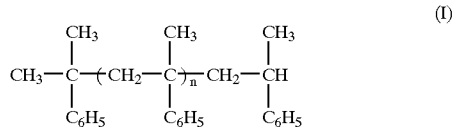

wherein n is a value from zero to 100, alternatively an average of from 2 to 10.

Such oligomers may be prepared, for example, by free radical, cationic or anionic polymerization as would be understood by one having skill in such art.

By tread traction it is meant handling, grip and cornering performance of the tire and particularly the tire's resistance to skidding on a road surface.

As hereinbefore discussed, where traction is to be emphasized for a tire tread, various resins may be desired to be included in its rubber composition.

The term "softening point" for the resins, as hereinbefore observed, refers to Ring and Ball softening point as determined by ASTM No. E28.

Representative examples of such contemplated resins are petroleum hydrocarbon resins, coumarone-indene resins, alkylated petroleum hydrocarbon resins, aromatic hydrocarbon resins, dicyclopentadiene/diene resins, and rosin and rosin derivatives.

Preferred contemplated resins are of the coumarone-indene type, dicyclopentadiene/diene type, and aromatic petroleum resins.

For example, for a coumarone-indene resin in a softening point range of about 20° C. to 40° C., a resin such as Cumar R-29 from Neville Chemical Co. is contemplated. Coumarone-indene resins are a class of resins recognized by those having skill in such resin art. They are typically derived from the polymerization of coumarone and indene.

For example, for an alkylated petroleum hydrocarbon resin in about a 120° C. to 150° C. softening point range, primarily saturated alkylated resins are contemplated such as, for example, Nevchem 150 by Neville Chemical Co. Such resins might be prepared, for example, by the alkylation of aromatic hydrocarbons with dicyclopentadiene (see U.S. Pat. No. 3,023,200).

For example, for an aromatic petroleum hydrocarbon resin in an intermediate softening point range of about 90° C. to about 110° C. a resin such as LX-782 by Neville is contemplated. In one aspect, such resins contain carbon-to-carbon unsaturation (double bonds) and may conventionally be a mixture of aromatic and acyclic polymer moieties, although they may be referred to as 'aromatic petroleum resins". The aromatic component of the resin is preferably selected from styrene, alpha-methylstyrene or t-butyl styrene and the remaining component of the resin is an aliphatic hydrocarbon. Such class of resins are believed to be recognized as such by those having a skill in such resin art.

A dicyclopentadiene/diene resin composition might be contemplated as being a reaction product of the polymerization reaction between dicyclopentadiene and at least one olefin hydrocarbon (a diene) copolymerizable therewith which has 4 to 12 carbon atoms and which is selected from monoolefins and diolefins. While various diolefins are contemplated, including limonene and cyclooctadiene, cyclooctadiene is preferred. Preferably, such dicyclopentadiene-olefin copolymer is comprised of about 50 to about 80 weight percent dicyclopentadiene. Such resin is contemplated which has a softening point in a range of about 20° C. to about 170° C. or even up to about 220° C. Thus, on a preferable basis, for example, a dicyclopentadiene/cyclooctadiene copolymer resin composed of about 50 to about 80 weight dicyclopentadiene is contemplated.

Representative of such various dicyclopentadiene/ diene resins are shown in U.S. Pat. No. 3,927,144 and, for such disclosure, is hereby incorporated herein by reference.

In the compounding of the tire tread, various rubbers may be used which are, preferably, relatively high unsaturation diene-based rubbers. Representative examples of such rubbers are polymers and copolymers of dienes such as, for example, isoprene and 1,3-butadiene and copolymers of such dienes with styrene and/or alpha-methyl styrene, preferably styrene.

Representative of such rubbers are, although they may not be so limited, for example: styrene/butadiene rubber, cis 1,4-polyisoprene rubber (natural and synthetic) cis 1,4-polybutadiene rubber, acrylonitrile-butadiene rubber, styrene/isoprene/butadiene rubber, styrene/isoprene rubber, high vinyl polybutadiene rubber having a vinyl content of from 40 to 90 percent, and 3,4-polyisoprene.

It should readily be understood by one having skill in the art that said tread portion of the pneumatic tire, as well as the rubber or other material in the basic carcass, which normally contains reinforcing elements in the tread region, can be compounded by methods generally known in the rubber compounding art, such as mixing the various sulfur-vulcanizable constituent rubbers with various commonly-used additive materials such as, for example, curing aids, such as sulfur, activators, retarders and accelerators, processing additives, such as oils, resins including tackifying resins, silicas, and plasticizers, fillers, pigments, stearic acid, zinc oxide, waxes, antioxidants and antiozonants, peptizing agents and reinforcing materials such as, for example, carbon black. As known to those skilled in the art, depending on the intended use of the sulfur-vulcanizable and sulfur-vulcanized materials (rubbers), the certain additives mentioned above are selected and commonly used in conventional amounts.

Such pneumatic tires are conventionally comprised of a generally toroidal-shaped carcass with an outer circumferential tread, adapted to be ground contacting, spaced beads and sidewalls extending radially from and connecting said tread to said beads.

For high performance applications, typical additions of carbon black comprise about 60 to about 140 parts by weight of diene rubber (phr), preferably 70 to 100 phr. Typical amounts of processing aids comprise 40 to 140 phr. Typical amounts of silica, if used, comprise about 10 to about 20 phr and amounts of silica coupling agent, if used, comprise about 0.05 to about 0.25 parts per part of silica, by weight. Representative silicas may be, for example, hydrated amorphous silicas and, particularly, precipitated silicas. A representative coupling agent may be, for example, a bifunctional sulfur-containing organo silane such as, for example, bis-(3-triethoxy-silylpropyl)tetrasulfide and/or disulfide, bis-(3-trimethoxy-silylpropyl)tetrasulfide and/or bisulfide, and bis-(3-trimethoxy-silylpropyl)tetrasulfide and/or disulfide grafted silica. Typical amounts of antioxidants comprise 1 to about 5 phr. Representative antioxidants may be, for example, diphenyl-p-phenylenediamine and others, such as those disclosed in *The Vanderbilt Rubber Handbook* (1978), pages 344–346. Suitable antiozonant(s) and waxes, particularly microcrystalline waxes, may be of the type shown in *The Vanderbilt Rubber Handbook* (1978), pages 346–347. Typical amounts of antiozonants comprise 1 to about 5 phr. Typical amounts of stearic acid comprise 1 to about 3 phr. Typical amounts of zinc oxide comprise 2 to about 5 phr. Typical amounts of waxes comprise 1 to about 5 phr. Typical amounts of peptizers comprise 0.1 to about 1 phr. The presence and relative amounts of the above additives are not an aspect of the present invention which is primarily directed to the utilization of specified blends of resins in tire treads as sulfur-vulcanizable compositions.

The vulcanization is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 8 phr with a range of from 1.5 to 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators in which a primary accelerator is generally used in the larger amount (0.5 to 1.0 phr), and a secondary accelerator which is generally used in smaller amounts (0.05–0.50 phr) in order to activate and to improve the properties of the vulcanizate. Combinations of such accelerators have historically been known to produce a synergistic effect of the final properties of sulfur-cured rubbers and are often somewhat better than those produced by use of either accelerator alone. In addition, delayed action accelerators may be used which are less affected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The tire can be built, shaped, molded and cured by various methods which will be readily apparent to those having skill in the art.

In the practice of this invention, the tread rubber containing the resin blend can be integral with and adhered to various tire carcass substrate rubber compositions. Typically, such a rubber composition is at least one of a styrene-butadiene copolymer rubber, cis 1,4-polyisoprene (natural or synthetic) rubber, 3,4-polyisoprene rubber, 1,4-polybutadiene rubber, styrene-butadiene-isoprene rubber and styrene-isoprene rubber. Optionally, such a blend for a portion of the tread, particularly where the tread is in the region of the sidewall area of the tire may contain one or more of butyl rubber, halobutyl rubber, such as chlorobutyl or bromobutyl rubber, and ethylene/propylene/conjugated diene terpolymer rubber, polyisoprene and polybutadiene rubbers.

In the further practice of this invention, the tread can typically be applied in the building of the green tire in which the uncured, shaped tread is built onto the carcass following which the green tire is shaped and cured.

Alternately, the tread can be applied to a cured tire carcass from which the previous tread has been buffed or abraded away and the tread cured thereon as a retread.

The practice of this invention is further illustrated by reference to the following examples which are intended to be representative rather than restrictive of the scope of the invention. Unless otherwise indicated, all parts and percentages are by weight.

EXAMPLE I

Rubber compositions were prepared for evaluating liquid alpha-methyl styrene oligomers for use in the invention and are reported as Samples A and B. Sample A is a Control Sample and Sample B utilizes a liquid alpha-methyl styrene oligomer, as is shown in the following Table 1.

Oligomeric alpha-methyl styrene (50 g) was dissolved in a 55 ml of reagent acetone in a one liter glass reactor. N330 carbon black (50 g) was added with stirring to homogeneously disperse the solution onto the carbon black. The solvent was removed at room temperature in a vacuum oven at 29 inches of Hg vacuum to give 100 g of black granules containing 50 percent alpha-methyl styrene oligomer.

The rubber compositions were prepared in an internal rubber mixer using three separate stages of addition (mixing), namely, two sequential non-productive mix stages (without the sulfur and accelerator curatives) to a mixing temperature of about 150° C. and one final productive mix stage (with sulfur and accelerator curatives) to a mixing temperature of about 115° C.

TABLE 1

| Materials | Sample A Control | Sample B |
|---|---|---|
| First Non-Productive Ingredients | | |
| Styrene/butadiene rubber[1] | 125 | 125 |
| Carbon black[2] | 88 | 88 |
| Processing oil[3] | 10.5 | 10.5 |
| Stearic acid | 1 | 1 |
| Zinc oxide | 1.3 | 1.3 |
| Alpha-methyl styrene oligomer[4] | 0 | 12 (6) |
| Antidegradant[5] | 1 | 1 |
| Liquid Styrene/butadiene rubber (30% styrene)[6] | 15 | 9 |
| Resin[7] | 21.5 | 21.5 |
| Productive Ingredients | | |
| Sulfur | 1.3 | 1.3 |
| Accelerator, sulfenamide and Thiuram type | 2.7 | 2.7 |

[1]Solution SBR elastomer having a Tg of about 16° C. and a Mooney of 130 oil extended with 25 phr aromatic oil
[2]N110 carbon black, an ASTM designation
[3]Aromatic rubber processing oil
[4]Prepared by free radical polymerization and reported in Table 1 as a 50/50 ratio, weight composition of the oligomer and carbon black.
[5]Quinoline type
[6]RICON ® 100 from Ricon Resins
[7]NORSOLENE ® S-155 from Sartomer company Physical properties of the rubber Samples are shown in the following Table 2 with the Stress-Strain, Rebound, Hardness, DIN abrasion and Tear resistance tests being conducted on vulcanized rubber samples.

TABLE 2

| Sample | Sample A Control | Sample B |
|---|---|---|
| Stress-Strain Data | | |
| Tensile Strength, MPa | 13.18 | 12.99 |
| Elongation, % | 536 | 545 |
| 100% Modulus, MPa | 1.91 | 1.72 |
| 300% Modulus, MPa | 6.79 | 6.44 |
| M300/M100 | 3.55 | 3.74 |
| Rebound Data | | |
| Rebound at 23° C. (%) | 10.0 | 10.2 |
| Rebound at 100° C. (%) | 26.9 | 28.5 |
| Hardness Data | | |
| Shore A Hardness, 23° C. | 77.0 | 73.9 |
| Shore A Hardness, 100° C. | 50.9 | 49.6 |
| DIN Abrasion Data | | |
| Volume loss (cm$^3$) | 187 | 191 |
| Tear Resistance Data (Strebler adhesion) | | |
| 120° C. | 85 | 104 |

TABLE 2-continued

| Sample | Sample A Control | Sample B |
|---|---|---|
| RPA Analyzer Data (100° C. at 1 Hz) | | |
| G' at 1% elongation (strain) | 3427 | 3066 |
| J" at 50% elongation (strain) | 0.572 | 0.559 |

It is readily seen from Table 2, Sample B, that the addition of the liquid alpha-methyl styrene oligomer is observed to significantly reduce the dynamic stiffness G' of the rubber composition at a low elongation (low strain) of one (1) percent as compared to Control Sample A which does not contain the oligomer.

This is considered herein to be significant because the reduced dynamic stiffness G' at the low elongation (1%) at 100° C. for Sample B is indicative of a good low temperature traction property for a tire tread of such rubber composition. In such manner, it is contemplated that the tire tread can be able to have improved traction before tire heat-up (temperature rise) can occur.

It can also be readily seen from Table 2, Sample B that the addition of the alpha-methyl styrene oligomer resulted in a comparable dynamic loss compliance at high strain (J" at 50% elongation) as compared to Sample A.

This is considered herein to be significant because a comparable dynamic loss compliance for both Control Sample A and Sample B is predictive of good tire traction and grip at higher tread temperatures.

In the particular, it is considered herein that a combination of
  (1) reduced dynamic stiffness G' at a low elongation of one (1) percent at 100° C. and
  (2) a substantially equivalent dynamic loss compliance J" at an elongation of 50° C. at 100° C. is predictive of good overall tire tread traction.

It can further readily seen from Table 2, Sample B, that the addition of the alpha-methyl styrene oligomer is observed to result in a reduced hardness for Sample B rubber while maintaining rebound values, with increased Strebler adhesion to itself as compared to Control Sample A.

This is considered herein to be significant because a softer tread (Sample B rubber) is predictive of better traction, with improved tear properties for a tire tread of such rubber composition.

It is also shown in Table 2 that the modulus ratio of 300 Modulus/100 Modulus is higher for the rubber in Sample A which tends to predict better resistance to tread wear for a tread of such rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having an outer circumferential tread where said tread is comprised of, based upon 100 parts by weight diene hydrocarbon based rubber (phr),
  (A) at least one said diene hydrocarbon based rubber; and
  (B) from about 1 to about 40 phr of a liquid alpha-methyl styrene oligomer;
  (C) about 3 to about 10 phr of reinforcing filler selected from at least one of carbon black, precipitated silica and silica modified carbon black; and
  (D) a coupling agent for said precipitated silica and/or silica modified carbon black having a moiety reactive with said precipitated silica and silica modified carbon black and another moiety interactive with at least one of said diene-based elastomers;

wherein said liquid alpha-methyl styrene oligomer is comprised of the general formula (I):

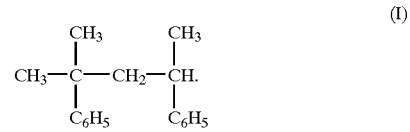

2. The tire of claim 1 which also contains about 1 to about 50 phr of at least one resin selected from at least one of:
  (A) coumarone-indene resin(s) having a softening point in a range of about 20° C. to about 40° C. derived from the polymerization of coumarone and indene;
  (B) alkylated hydrocarbon resin(s) having a softening point in a range of about 120° C. to about 150° C. prepared by alkylation of an aromatic hydrocarbon with dicyclopentadiene;
  (C) aromatic hydrocarbon resin(s) having a softening point in a range of about 90° C. to about 100° C. wherein the aromatic component of the resin is selected from styrene, alpha-methylstyrene or t-butylstyrene and the remaining component of the resin is an aliphatic hydrocarbon; and
  (D) dicyclopentadiene/diene resin(s) having a softening point in a range of about 20° C. to about 170° C. composed of a reaction product of about 50 to about 80 weight percent dicyclopentadiene with a diene selected from limonene and/or cyclooctadiene.

3. The tire of claim 2 wherein said resin is selected from at least one of coumarone-indene resin(s) dicyclopentadiene/diene resin(s), and aromatic hydrocarbon resin(s).

4. The tire of claim 2 wherein said resin is said coumarone-indene resin(s).

5. The tire of claim 2 wherein said resin is said alkylated hydrocarbon resin(s).

6. The tire of claim 2 wherein said resin is said aromatic hydrocarbon resin(s).

7. The tire of claim 2 wherein said resin is said dicyclopentadiene/diene resin(s).

8. The tire of claim 2 wherein said liquid alpha-methyl styrene oligomer is present in an amount of about 3 to about 10 phr and said reinforcing filler is present in an amount of about 60 to about 100 phr.

9. The tire of claim 8 wherein said coupling agent is comprised of a bis(3-triethoxy-silylpropyl)tetrasulfide or bis(3-triethoxy-silylpropyl)disulfide.

* * * * *